US012571759B2

(12) United States Patent　　　　(10) Patent No.:　US 12,571,759 B2
　　Kim et al.　　　　　　　　　　　(45) Date of Patent:　Mar. 10, 2026

(54) METHOD OF MANUFACTURING WORKING ELECTRODE FOR BIOSENSORS, WORKING ELECTRODE MANUFACTURED USING THE SAME, AND USE THEREOF

(71) Applicant: KOREA ELECTRONICS TECHNOLOGY INSTITUTE, Seongnam-si (KR)

(72) Inventors: Seong Eun Kim, Seoul (KR); Se Eun Jeong, Seoul (KR)

(73) Assignee: KOREA ELECTRONICS TECHNOLOGY INSTITUTE, Seongnam-si (KR)

( * ) Notice:　Subject to any disclaimer, the term of this patent is extended or adjusted under 35 U.S.C. 154(b) by 204 days.

(21) Appl. No.: 18/511,174

(22) Filed:　Nov. 16, 2023

(65)　　　Prior Publication Data

US 2024/0319132 A1　Sep. 26, 2024

(30)　　Foreign Application Priority Data

Nov. 17, 2022　(KR) ........................ 10-2022-0154659

(51) Int. Cl.
　　*G01N 27/327*　　(2006.01)
(52) U.S. Cl.
　　CPC ..... *G01N 27/3276* (2013.01); *G01N 27/3277* (2013.01)
(58) Field of Classification Search
　　None
　　See application file for complete search history.

(56)　　　References Cited

FOREIGN PATENT DOCUMENTS

KR　10-2011-0019224　A　2/2011
KR　10-2020-0077058　A　6/2020
KR　10-2022-0071671　A　5/2022

OTHER PUBLICATIONS

T. Lee, et al., "Fabrication of Troponin I Biosensor Composed of Multi-Functional DNA Structure / Au Nanocrystal Using Electrochemical and Localized Surface Plasmon Resonance Dual-Detection Method", Nanomaterials, 9(7): 1000, 13 pages, Jul. 2019.*
S. Wang, et al., "Avidin-Biotin Technology in Gold-Nanoparticle-Decorated Graphene Field Effect Transistors for Detection of Biotinylated Macromolecules with Ultrahigh Sensitivity and Specificity", ACS Omega, 5(46):p. 30037-30046, Nov. 2020.*
Office Action received in Korean Application No. 10-2022-0154659 dated Feb. 14, 2025.
Wang et al., "Avidin—Biotin Technology in Gold Nanoparticle-Decorated Graphene Field Effect Transistors for Detection of Biotinylated Macromolecules with Ultrahigh Sensitivity and Specificity," ACS Omega, Nov. 12, 2020, vol. 5, pp. 30037-30046.

* cited by examiner

*Primary Examiner* — J. Christopher Ball

(74) *Attorney, Agent, or Firm* — Knobbe, Martens, Olson & Bear, LLP

(57)　　　ABSTRACT

Disclosed are a method of manufacturing a working electrode for biosensors, the method including (a) providing a substrate, (b) forming a metal nanostructure on a surface of the substrate, (c) immobilizing a first linker compound on a surface of the metal nanostructure, and (d) binding a response factor to the first linker compound, a working electrode manufactured using the same, a biosensor including the working electrode, and a method of measuring the concentration of a biomarker in a sample using the biosensor.

12 Claims, 4 Drawing Sheets

FIG. 4

METHOD OF MANUFACTURING WORKING ELECTRODE FOR BIOSENSORS, WORKING ELECTRODE MANUFACTURED USING THE SAME, AND USE THEREOF

TECHNICAL FIELD

The present disclosure relates to a method of manufacturing a working electrode for biosensors, a working electrode manufactured by the method, and the use thereof.

BACKGROUND TECHNOLOGY

A biosensor is a signal converter that detects physical and chemical information from living organisms and measures the information to obtain useful information. As the medical paradigm in modern society shifts from treatment to prevention and diagnosis-based precision medicine, the need for biosensors is rapidly increasing in medicine and the biosensor is attracting attention in various fields such as the environment and food.

Nowadays, research is being conducted on, as biosensors capable of self-diagnosis in the field, electrochemical sensors that measure the concentration of biomarkers for diseases present in samples collected from the human body using electrochemical signals.

These biosensors require bio-supports to immobilize a response factor that can react with and bind to biomarkers to a working electrode.

CITATION LIST

Patent Literature (Patent Document 1) KR 10-2022-0071671 A

DISCLOSURE

Technical Tasks

The present disclosure is intended to provide a method of manufacturing a working electrode for biosensors including a metal nanostructure, a working electrode manufactured by the method, and use thereof.

Technical Solution

A first aspect of the present disclosure provides a method of manufacturing a working electrode for biosensors, the method including (a) providing a substrate, (b) forming a metal nanostructure on a surface of the substrate, (c) immobilizing a first linker compound on a surface of the metal nanostructure, and (d) binding a response factor to the first linker compound.

In an embodiment, the substrate may be an ITO glass substrate.

In an embodiment, step (b) may include forming a nucleus of the metal nanoparticle on the surface of the substrate, growing the nucleus using a metal-containing solution, and annealing the substrate.

In an embodiment, a concentration of the metal in the metal-containing solution may be 1 to 20 mM.

In an embodiment, an average particle size of the metal nanostructure may be 50 to 150 nm.

In an embodiment, the metal nanostructure may be a gold nanostructure.

In an embodiment, the first linker compound may be avidin.

In an embodiment, the response factor may be a response factor conjugated with a second linker compound and the first linker compound in step (d) binds to the second linker compound.

In an embodiment, the second linker compound may be biotin.

A second aspect of the present disclosure provides a working electrode for biosensors manufactured using the method.

A third aspect of the present disclosure provides a biosensor including the working electrode for biosensors manufactured using the method or the working electrode for biosensors.

A fourth aspect of the present disclosure provides a method of measuring a concentration of a biomarker in a sample using the biosensor, the method including immersing the working electrode in the sample, and measuring an electrical signal generated by an electrical redox reaction from the immersed working electrode.

Advantageous Effects

The present disclosure provides a working electrode for biosensors including a metal nanostructure, a method of manufacturing the same, and the use thereof, and the working electrode of the present disclosure is capable of providing excellent sensing sensitivity and accuracy.

BRIEF DESCRIPTION OF THE DRAWINGS

FIG. 4 is a graph showing comparison of the particle size of the nanostructure as a function of the concentration of a metal-containing solution measured according to Example.

DETAILED DESCRIPTION OF EMBODIMENTS

Figure 1:
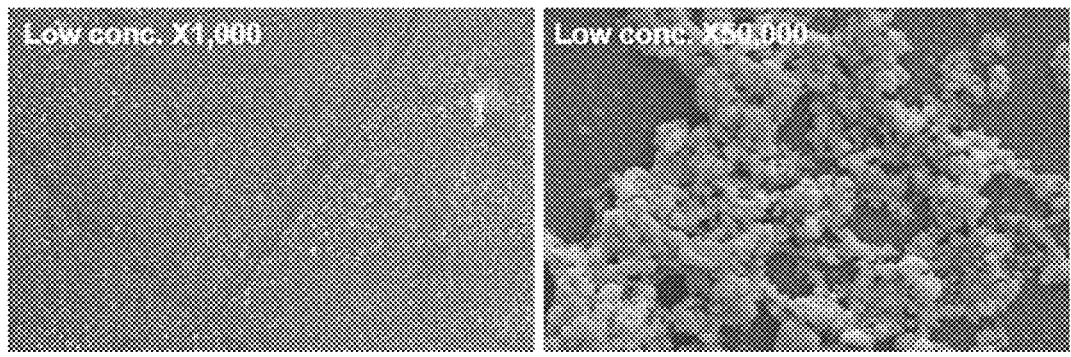
FIGS. 1 to 3 are SEM images showing gold nanostructures produced according to Example.

The objects, advantages and features of the present disclosure will be understood more clearly from the following detailed description and preferred embodiments in conjunction with the accompanying drawings, but the present disclosure is not necessarily limited thereto. In the following description of the present invention, detailed descriptions of well-known related art will be omitted when they may obscure the subject matters of the present invention.

Method of Manufacturing Working Electrodes for Biosensors

The present disclosure provides a method of manufacturing a working electrode for biosensors, the method including (a) providing a substrate, (b) forming a metal nanostructure on the surface of the substrate, (c) immobilizing a first linker compound on the surface of the metal nanostructure, and (d) binding a response factor to the first linker compound.

In one embodiment of the present disclosure, the substrate may be an ITO glass substrate. The ITO glass substrate has advantages in that noise signals can be reduced when the ITO glass substrate is applied to a biosensor and a substrate having a configuration in which an ITO thin film is deposited on a glass substrate can be used without a separate adhesive layer. The ITO glass substrate can be advantageously manufactured into an electrode at a very low cost because the same thin film substrate manufacturing process with high and stable electrical conductivity can be applied to large substrates in the display industry, or the like.

A metal nanostructure is formed on the surface of the substrate. As will be described later, the metal nanostructure serves to improve the sensitivity and accuracy of the biosensor by compensating for the sensitivity inhibition of the electrochemical signal by the bio-support. Accordingly, the metal of the present disclosure may be limited to a metal that can be used to produce a metal nanostructure capable of performing this function, and examples of such a metal include gold, silver, nickel, platinum, aluminum, copper, an alloy of two or more thereof, or any combination of two or more thereof. Most preferably, the metal nanostructure may be a gold nanostructure in terms of the sensitivity, accuracy, and excellent biocompatibility of the biosensor, as well as the method of forming the metal nanostructure described later.

According to one embodiment of the present disclosure, the forming a metal nanostructure on the surface of the substrate includes producing nuclei of metal nanoparticles on the surface of the substrate, growing the nuclei using a metal-containing solution, and annealing the substrate.

Specifically, the formation of gold nanostructures is described as an example, but the solutions described herein are illustrative and do not limit the scope of the present disclosure. In order to produce nuclei of gold nanoparticles on the substrate surface, the substrate may be immersed in an $AuCl_4$ solution and then an ammonium hydroxide solution may be added thereto.

In order to grow the produced nuclei, the substrate may be immersed in a sodium borohydride solution, and then in a mixed solution of an $AuCl_4$ solution; and an ammonium hydroxide solution, a sodium borohydride solution, or a combination thereof.

Then, the substrate may be annealed at a temperature of about 300 to 500° C., preferably about 350 to 450° C., more preferably about 350 to 400° C. The annealing enables the metal nanostructures to be aligned, resulting in alignment of the antibodies immobilized on the surface of the metal nanostructures.

Optionally, the method of forming the metal nanostructure may include washing and/or drying the substrate before and after each step. The washing and/or drying facilitates the subsequent reaction by removing impurities and unreacted substances remaining on the substrate.

In one embodiment of the present disclosure, the concentration of the metal in the metal-containing solution used in the process of growing nuclei may be about 1 to 20 mM. Preferably, the concentration may be about 1.5 to about 18 mM, more preferably about 3.5 to about 17 mM, and even more preferably about 7.5 to about 15 mM. When the concentration is less than the range defined above, the particle size of the formed metal nanostructure is too small to provide a sufficient area for the antibody to be immobilized on the surface of the metal nanostructure, thus disadvantageously lowering the sensitivity of the biosensor. On the other hand, when the concentration is higher than the range defined above, the particle size of the formed metal nanostructure is excessively large and the reaction surface area for the electrochemical signal material is excessively small, causing a problem of less signal amplification effect compared to the appropriate concentration.

The average particle size of the metal nanostructure formed by the method may be about 50 to about 150 nm. Preferably, the average particle size may be about 80 to 140 nm, and more preferably about 100 to 120 nm.

The method of manufacturing a working electrode of the present disclosure includes immobilizing a first linker compound on the surface of the metal nanostructure. As used herein, the term "linker compound" refers to a compound that indirectly links a substrate to a response factor, particularly a compound that indirectly links a metal nanostructure on the surface of the substrate to a response factor. Further, as used herein, the term "response factor" refers to a substance that can react with and bind to a biomarker present in a sample (for example, an antibody that can bind to an antigen when the biomarker is the antigen). The linker compound corresponds to a bio-support that can stably immobilize the response factor on a substrate.

In the present disclosure, any linker compound may be used without particular limitation as long as it is capable of (indirectly) immobilizing a response factor on the substrate surface without impairing the purpose of the present disclosure. For example, the first linker compound may be avidin. More specifically, according to one embodiment of the present disclosure, the avidin may be neutravidin, natural avidin, streptavidin, captavidin, or any combination thereof. The method of immobilizing the first linker compound on the substrate is not particularly limited and may be performed through known techniques.

In the method of manufacturing the working electrode according to the present disclosure, the response factor is immobilized on the surface of the metal nanostructure. More specifically, the response factor binds to the first linker compound and is immobilized on the surface of the metal nanostructure. In one embodiment of the present disclosure, the response factor may be a response factor conjugated with a second linker compound. The second linker compound may be a substance that reacts with and binds to the first linker compound and may be changed depending on the first linker compound. For example, when the first linker compound is avidin, the second linker compound may be biotin. When the second linker compound binds to the first linker compound, the response factor may be immobilized on the metal nanostructure.

In another embodiment of the present disclosure, the method may further include binding the response factor to the first linker compound prior to immobilizing the first linker compound on the surface of the metal nanostructure. That is, after binding the response factor to the first linker compound through the binding of the second linker compound to the first linker compound conjugated with the response factor, the first linker compound conjugated with the response factor may be immobilized on the surface of the metal nanostructure.

Working Electrode for Biosensor and Biosensor Including Same

The present disclosure also provides a working electrode for a biosensor manufactured by the method and a biosensor including the same. The working electrode includes a substrate, a metal nanostructure formed on the surface of the substrate, a linker compound, and a response factor. Details of each component have been described above.

The working electrode of the present disclosure provides sensing sensitivity at least 2 times, preferably at least 3 times, more preferably at least 4 times, and most preferably at least 6 times that of a conventional working electrode not including a metal nanostructure.

The bio-support used to bind the response factor to the substrate is generally a nonconductor and such a nonconductor has a problem of interfering with the detection of electrochemical signals and adversely affecting detection sensitivity. Although not bound by a specific theory, it was possible to achieve the high sensing sensitivity described above because the metal nanostructure with excellent electrical conductivity in the present disclosure reduces interference with the flow of electrochemical signals by the bio-support, and furthermore, the three-dimensional structure of the metal nanostructure increases the reaction specific surface area.

Meanwhile, when a metal substrate with high electrical conductivity (for example, an Au substrate) is used as an electrode, a relatively high signal can be obtained, but the problem of increasing background noise also occurs. On the other hand, the working electrode of the present disclosure can improve only the signal of the substance to be detected while reducing background noise, thus having an advantage over conventional metal substrates.

Method of Measuring Concentration of Biomarker in Sample

The present disclosure provides a method for measuring the concentration of a biomarker in a sample using the biosensor including the working electrode described above. The method includes: immersing a working electrode in a sample; and measuring an electrical signal generated by an electrical redox reaction from the immersed working electrode.

The sample used for measurement in the present disclosure may be bodily fluid derived from an animal. More specifically, the sample may be bodily fluid derived from the human body. Here, the bodily fluid means, for example, blood, urine, saliva, or the like, and is not limited to the examples described above. Any bodily fluid may be used as long as it contains a target substance to be analyzed.

In the present disclosure, the biomarker may be an antigen, antibody, vitamin, protein, immune molecule, DNA, RNA, or the like. In one embodiment of the present disclosure, the biomarker may be present in exosomes or extracellular vesicles (EV).

In the present disclosure, the biomarker may generally be a material that cannot be oxidized or reduced. In order to determine whether such a biomarker is present or not, the use of an electrical redox enzyme and substrate is considered.

In one embodiment of the present disclosure, the measuring an electrical signal generated by an electrical redox reaction from the immersed working electrode includes: treating the working electrode immersed in the sample with an electrical redox enzyme; immersing the working electrode in a solution containing an electrical redox substrate; and applying a redox voltage thereto to measure an electrical signal generated during a redox reaction.

A method of measuring the concentration of a biomarker using Gli36 GBM exosomes as a target material will be described as an example of the method according to the present disclosure. First, a biosensor including the working electrode according to an embodiment of the present disclosure is prepared. A response factor (epidermal growth factor receptor (EGFR) antibody) conjugated with a second linker compound (biotin) is indirectly immobilized through a first linker compound (avidin) on the metal nanostructure formed on the surface of the working electrode. The use of avidin and biotin as the first and second linker compounds, respectively, is advantageous in that the orientation of the binding site of the immobilized enzyme exposed to the surface area can be easily controlled, exposure of the enzyme to the binding site can be maximized based on appropriate control orientation of the enzyme on the surface, and the detection of the target material in the sample can be maximized based thereon.

Then, the working electrode is immersed in a sample derived from a patient. By immersing the working electrode in the sample, the biomarker with a specific disease (EGFR antigen) present in the sample binds to the response factor (EGFR antibody) immobilized on the surface of the working electrode through a reaction (antigen-antibody reaction).

After the working electrode is immersed in the sample, the immersed working electrode is treated with an electrical redox enzyme. Then, the treated working electrode is immersed in a solution containing an electrical redox substrate and a redox voltage is applied thereto to measure an electrical signal resulting from a redox reaction.

As used herein, the term "electrical redox enzyme" refers to a substance that activates an electrical redox substrate to enable a redox reaction. In addition, as used herein, the term "electrical redox substrate" refers to a material that absorbs or releases electrons generated by a redox reaction through a voltage applied by the working electrode.

For example, when ALP (alkaline phosphatase) is used as the electrical redox enzyme, AAP (ascorbic acid-2-phosphate) is used as the electrical redox substrate. As the phosphate functional group of AAP is separated by ALP, the AAP is converted to AA (ascorbic acid) as an enzyme reaction product. The AA is oxidized to dehydroascorbate by the oxidation voltage applied by the working electrode. The electrical signal, for example, a current, generated during the oxidation reaction, can be measured and the concentration of the desired target substance in the sample can be calculated therefrom.

The electrical redox enzyme may be bound to the biomarker by treated to the working electrode immersed in the sample. Here, a method of treating with the enzyme is not particularly limited as long as it is possible to uniformly bind the enzyme to the biomarker bound to the response factor immobilized on the surface of the working electrode. For example, the enzyme may be bound to the biomarker by a well-known method such as spraying, immersion, or immersion.

Since an enzyme has substrate specificity, the enzyme in the present disclosure may bind directly or indirectly to the biomarker. For indirect binding, a secondary antibody capable of binding to a biomarker (antigen) that is different from the response factor (namely, "primary antibody") immobilized on the surface of the working electrode and an electrical redox enzyme-linked antibody containing an electrical redox enzyme binding to the secondary antibody may be used.

For example, a CD63 antibody different from the EGFR biotinylated antibody (primary antibody) is used as a secondary antibody and an ALP-linked anti-mouse IgG may be used as the electrical redox enzyme-linked antibody capable of binding to the secondary antibody.

Since the redox reaction of the electrical redox substrate is performed only when the electrical redox enzyme binds to the antigen bound to the antibody immobilized on the working electrode, the electrical signal measured through the electrical redox reaction depends on the concentration of the antigen in the sample. Therefore, it is possible to calculate the concentration of the antigen in the sample from the electrical signal.

In the present disclosure, the electrical redox enzyme includes ALP, horseradish peroxidase (HRP), glucose oxidase, luciferase, beta-D-galactosidase (P malate dehydrogenase, MDH), acetylcholinesterase, or the like. Particularly preferably, the enzyme may be ALP or HRP. The ALP and HRP have an advantage of having highly sensitive reactivity. In particular, HRP is inexpensive and cost-effective. In addition, ALP has an advantage of having a long signal retention time of about 24 to 48 hours.

The electrical redox substrate of the present disclosure may be a substrate corresponding to the electrical redox enzyme, such as AAP, which is activated by ALP.

Known electrochemical measurement methods may be used to measure the electrical signals. In one embodiment of the present disclosure, cyclic voltammetry (CV) may be used. Cyclic voltammetry is a method of measuring current by circulating the voltage applied to the working electrode at a constant speed, through which a cyclic voltammetry curve can be obtained. Here, the electrical signal measured through the cyclic voltammetry means a maximum current the cyclic voltammetry curve. The concentration of the antigen in the sample can be measured by measuring the current at a predetermined voltage, that is, by measuring the degree of redox reaction of the electrical redox substrate by the enzyme of the electrical redox reaction bound to the biomarker.

Hereinafter, preferred examples are provided to illustrate the present disclosure. However, the following examples are provided only for better understanding of the present disclosure and should not construed as limiting the scope of the present disclosure.

EXAMPLE

1. Formation of Gold Nanostructures on Substrate

The ITO glass substrate was sequentially washed by sonication in acetone, IPA (isopropyl alcohol) and distilled water for 4 minutes each.

The washed substrate was immersed in an orange 3 mM $AuCl_4$ (chloroauric acid) solution at room temperature for about 10 minutes, ammonium hydroxide was added thereto to about 60% (20 μl/ml) of the solution and the resulting mixture was allowed to stand at room temperature for about 15 minutes. At this time, the color of the solution was pale orange.

Then, the substrate was washed using two water baths, and then was immersed in a 1 mM sodium borohydride solution for about 15 minutes. After 15 minutes, the color of the substrate was blue-purple. The substrate was washed using two water baths.

The washed substrate was immersed in a mixed solution of a 1.5 mM $AuCl_4$ solution and a 1.5 mM ammonium hydroxide solution and then was allowed to stand at room temperature for about 30 minutes. The substrate was washed using a water bath and then moisture was thoroughly removed from the surface of the substrate using $N_2$ gas.

Then, the substrate was annealed in an oven heated to about 400° C. for about 2 hours. The substrate (sample A) finally obtained by annealing was found to turn light red.

Figure 2:
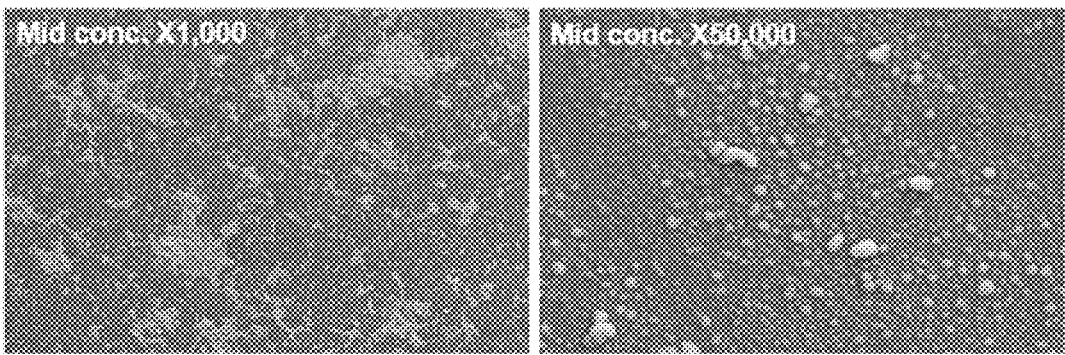
Figure 3:
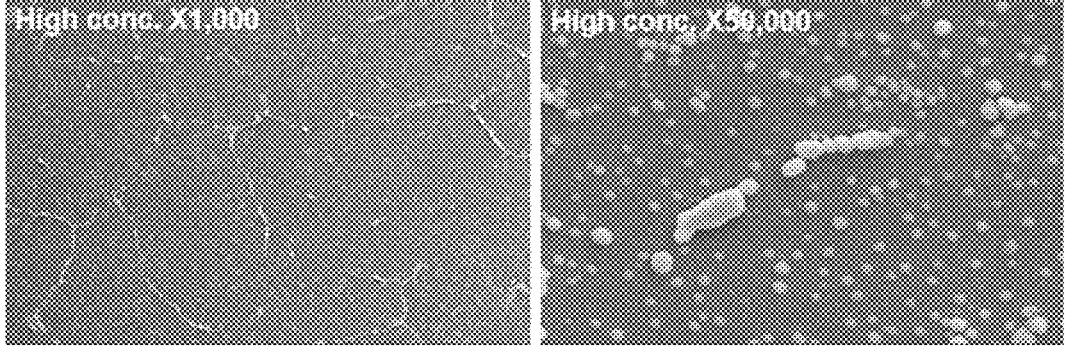

Sample B was prepared in the same manner as described above, except that the concentration of each solution was changed from 1.5 mM to 3.75 mM in the mixed solution of the $AuCl_4$ solution and the ammonium hydroxide solution, and sample C was prepared in the same manner as described above, except that the concentration of each solution was changed from 1.5 mM to 7.5 mM in the mixed solution of the $AuCl_4$ solution and the ammonium hydroxide solution. The surfaces of samples A to C were observed with an electron microscope and the results are shown in FIGS. 1 to 3.

2. Comparison in Particle Size of Gold Nanostructures

Figure 4:
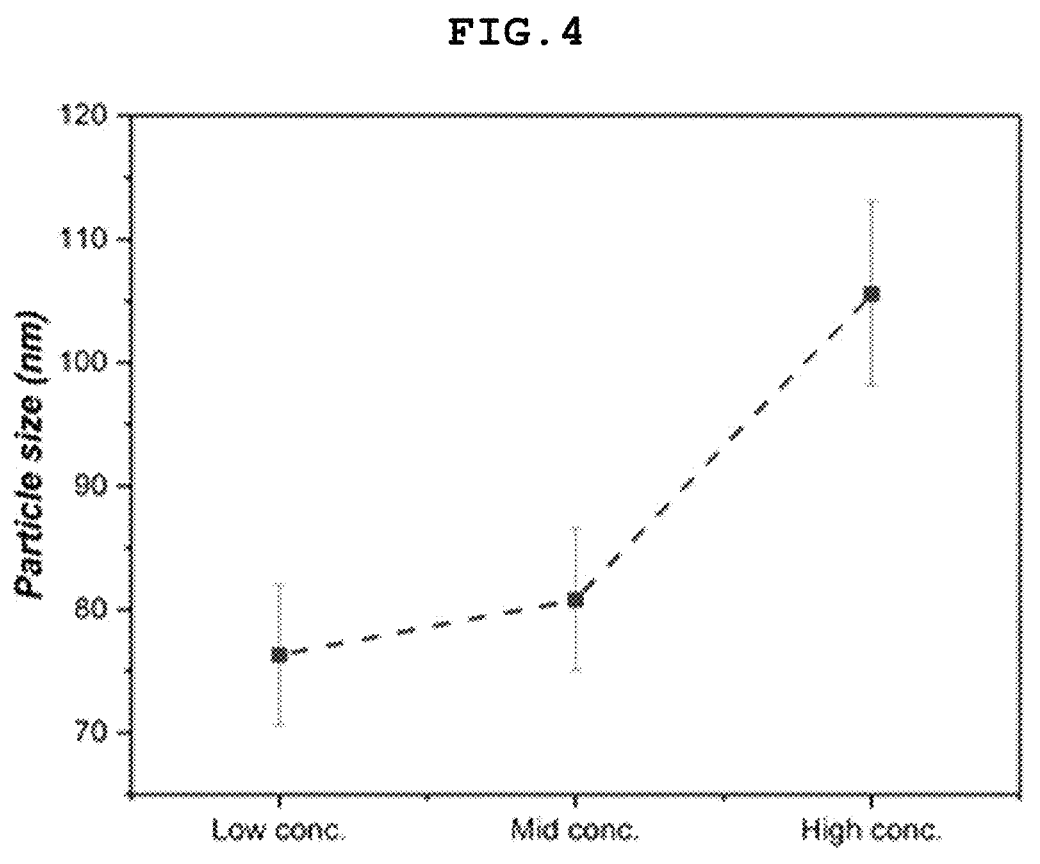

The average particle size of each of samples A to C was measured (n=10). The results are shown in FIG. 4. In FIG. 4, low conc. corresponds to sample A, mid conc. corresponds to sample B, and high conc. corresponds to sample C. The average particle size of sample A was measured to be approximately 76.30952 nm, the average particle size of sample B was measured to be approximately 80.83333 nm, and the average particle size of sample C was measured to be approximately 105.5952 nm. These results show that it is possible to form gold nanostructures with a large average particle size using a high concentration of gold solution and it is expected that the desired metal nanostructure can be manufactured as needed by simply adjusting the concentration of the mixed solution.

3. Comparison of Working Electrode Performance Depending on Presence or Absence of Gold Nanostructures The sample C was used as a working electrode in Experimental Example 1, and an ITO glass substrate having no gold nanostructures was prepared as a working electrode in Comparative Experimental Example 1.

The surface of each electrode was ultrasonicated for 15 minutes in 10 mL of a trichloroethylene solution, an ethanol solution, and DI water, and the electrode was immersed in a 30% KOH solution for 10 minutes, and then washed with distilled water to activate the OH group on the electrode surface. Then, the working electrode was treated with 3-(aminopropyl)triethoxysilane (APTES) and glutaraldehyde (GA). The electrode was reacted with 15 μl of 100 μg/ml avidin at room temperature for about 2 hours and then reacted with 15 μl of 1% bovine serum albumin (BSA) at 25° C. for about 40 minutes. Then, the electrode was reacted with 15 μl of biotinylated ALP (20 μg/ml) at 25° C. for about 1 hour.

Figure 5:
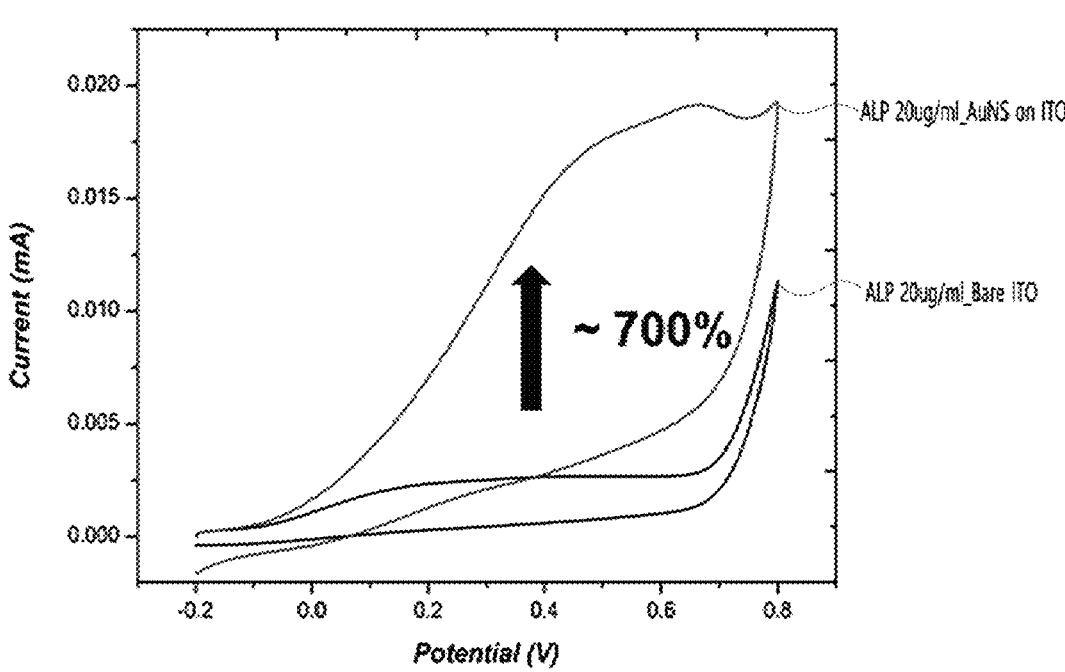
FIGS. 5 to 7 show electrochemical signal intensities measured according to Example.

The electrode was immersed in a sample containing ascorbic acid-2-phosphate (AAP) at 37° C. After immersion, the current relative to voltage was measured using cyclic voltammetry. The voltage was cycled between 0 and 0.8V. The results of measurement for each of Experimental Example 1 and Comparative Experimental Example 1 are shown in FIG. 5. AuNS on ITO and bare ITO in FIG. 5 correspond to Experimental Example 1 and Comparative Experimental Example 1, respectively. In addition, the currents of Experimental Example 1 and Comparative Experimental Example 1 at 0.6 V are shown in Table 1 below.

TABLE 1

| | $1^{st}$ measurement | $2^{nd}$ measurement | $3^{rd}$ measurement | Average | Experiment example 1/ Comparative Experiment Example 1 |
|---|---|---|---|---|---|
| Experiment example 1 (mA) | 3.17E−03 | 2.58E−03 | 2.29E−03 | 2.68E−03 | 696.623% |
| Comparative Experiment | 3.06E−02 | 7.20E−03 | 1.82E−02 | 1.87E−02 | |

TABLE 1-continued

| | 1$^{st}$ measurement | 2$^{nd}$ measurement | 3$^{rd}$ measurement | Average | Experiment example 1/ Comparative Experiment Example 1 |
|---|---|---|---|---|---|
| Example 1 (mA) | | | | | |

As can be seen from Table 1 and FIG. 5, the signal measured in Experimental Example 1 was improved by about 700% compared to the signal measured in Comparative Experimental Example 1. This indicates that the formation of the metal nanostructure on the electrode surface significantly increased the sensitivity of the electrochemical signal, and therefore, it can be expected that it is possible to manufacture a better biosensor using the working electrode of the present disclosure.

4. Comparison of Working Electrode Performance Depending on Presence or Absence of Target Biomarker Sample C was used as a working electrode in Examples A and B, and an ITO glass substrate having no gold nanostructures was prepared as a working electrode in Comparative Examples A and B.

A sample containing the corresponding biomarker was prepared using a Gli36 GBM cell line exosome as a target biomarker and an antibody (EGFR antibody as the primary antibody, or CD63 antibody as the secondary antibody) capable of capturing the exosome was immobilized on the working electrode.

(1) Example A and Comparative Example A

Each working electrode was immersed in a sample having no target biomarker and the current was measured using conversion from AAP to AA by the ALP enzyme and cyclic voltage (CV). In Example A and Comparative Example A, the secondary antibody bound to the ALP enzyme was not specifically attached to the electrode. Therefore, it is considered that the measured current is derived from the background noise of the electrode itself and the non-specific reaction of the secondary antibody.

(2) Example B and Comparative Example B

Each working electrode was immersed in a sample containing the target biomarker ($10^8$ ptcl/ml) and the current was measured using conversion of AAP to AA by the ALP enzyme and cyclic voltage (CV).

Figure 6:
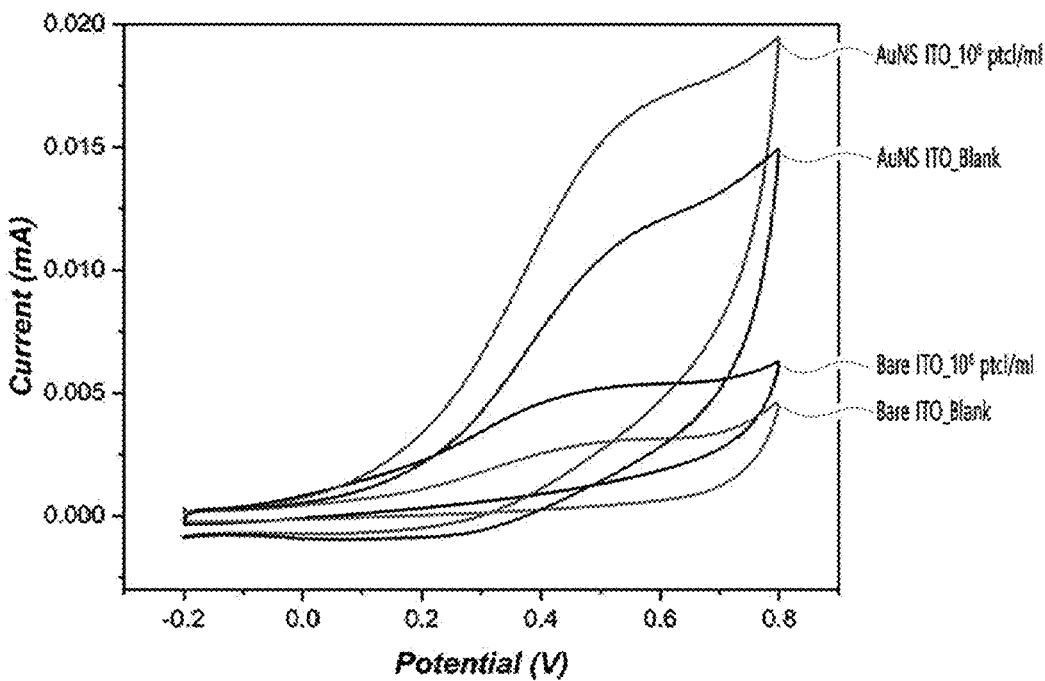
Figure 7:
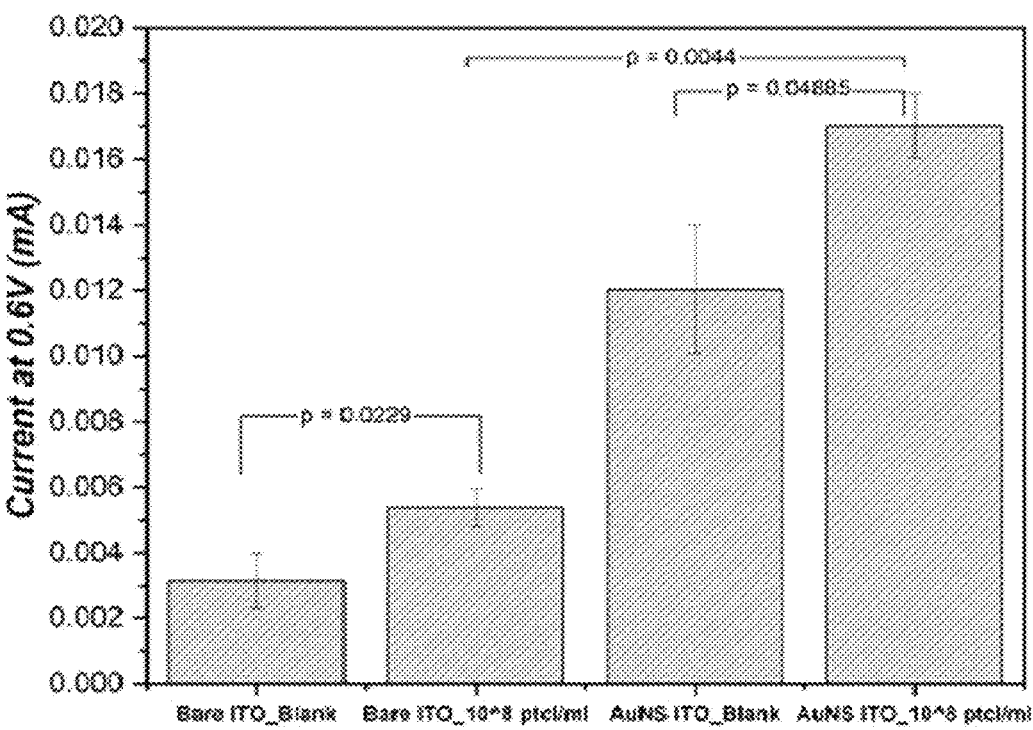

The results of measurement are shown in FIGS. 6 and 7. In FIGS. 6 and 7, Bare ITO_Blank, Bare ITO_$10^8$ ptcl/ml, AuNS ITO_Blank, and AuNS ITO_$10^8$ ptcl/ml correspond to Comparative Examples A and B, and Examples A and B, respectively. In FIG. 7, p means a p value, and all p values are less than 0.05.

As can be seen from FIG. 6, Example exhibited a higher current at 0.6 V, compared to Comparative Example.

Further, as can be seen from FIG. 7, the current difference between Examples A and B (about 0.0066) at 0.6 V is about 3 times greater than the current difference between Comparative Examples A and B (0.0022).

This suggests that the working electrode of the present disclosure can significantly increase the ratio of (signal sensitivity to target biomarker)/(background noise), contributing to the manufacture of a biosensor with better sensitivity.

Any simple alteration or modification is possible without departing the scope of the present disclosure and the specific scope of the present disclosure is defined only by the appended claims.

What is claimed is:

1. A method of manufacturing a working electrode for biosensors, the method comprising:
 (a) providing a substrate;
 (b) forming a gold nanostructure on a surface of the substrate, by:
  immersing the substrate in an $AuCl_4$ solution to produce nuclei of gold nanoparticles on the surface of the substrate,
  immersing the substrate with the nuclei of gold nanoparticles in a mixed solution of the $AuCl_4$ solution and at least one of an ammonium hydroxide solution or a sodium borohydride solution to grow the nuclei produced on the surface of the substrate, and
  annealing the substrate with the grown nuclei of the gold nanoparticles to form the gold nanostructure;
 (c) immobilizing a first linker compound on a surface of the gold nanostructure; and
 (d) binding a response factor to the first linker compound,
 wherein in step (b), the substrate with the grown nuclei of the gold nanoparticles is annealed at a temperature of about 300° C. to 500° C. to align the gold nanostructure such that the response factor immobilized on the surface of the gold nanostructure is aligned.

2. The method according to claim 1, wherein the substrate is an ITO glass substrate.

3. The method according to claim 1, wherein a concentration of gold in the $AuCl_4$ solution is 1 mM to 20 mM.

4. The method according to claim 1, wherein an average particle size of the gold nanostructure is 50 nm to 150 nm.

5. The method according to claim 1, wherein the first linker compound is avidin.

6. The method according to claim 1, wherein the response factor is a response factor conjugated with a second linker compound, and
 the first linker compound in step (d) binds to the second linker compound.

7. The method according to claim 6, wherein the second linker compound is biotin.

8. A working electrode for biosensors manufactured using the method according to claim 1.

9. A bio-sensor comprising the working electrode for biosensors according to claim 8.

10. A method of measuring a concentration of a biomarker in a sample using the biosensor according to claim 9, the method comprising:
 immersing the working electrode in the sample; and
 measuring an electrical signal generated by an electrical redox reaction from the immersed working electrode.

11. The method according to claim 1, wherein a concentration of gold in the $AuCl_4$ solution is 7.5 mM to 15 mM.

12. The method according to claim 1, wherein an average particle size of the gold nanostructure is 100 nm to 120 nm.

\* \* \* \* \*